United States Patent [19]

Shields

[11] 4,076,113
[45] Feb. 28, 1978

[54] APPARATUS FOR SIMULTANEOUSLY REORIENTING AND TRANSPORTING ARTICLES

[76] Inventor: Walter A. Shields, 181-41 Henley Road, Jamaica, N.Y. 11432

[21] Appl. No.: 744,482

[22] Filed: Nov. 24, 1976

[51] Int. Cl.² .............................................. B65G 47/24
[52] U.S. Cl. ..................................... 198/403; 198/480
[58] Field of Search ............... 198/403, 404, 408, 480, 198/481, 482, 489

[56] References Cited

U.S. PATENT DOCUMENTS

| | | | |
|---|---|---|---|
| 1,827,553 | 10/1931 | Algeo et al. | 198/408 |
| 2,175,177 | 10/1939 | Butler | 198/404 |
| 2,538,408 | 1/1951 | Baker et al. | 198/408 |
| 2,878,962 | 3/1959 | Chaney et al. | 198/481 |
| 3,128,889 | 4/1964 | Johnson et al. | 198/403 |
| 3,154,187 | 10/1964 | Roth | 198/404 |
| 3,306,427 | 2/1967 | Spencer | 198/404 |
| 3,623,210 | 11/1971 | Shields | 29/429 |
| 3,877,569 | 4/1975 | Shields | 198/377 |
| 3,904,192 | 9/1975 | Pfeifer et al. | 198/403 |
| 3,964,847 | 6/1976 | Redmer et al. | 198/404 |

FOREIGN PATENT DOCUMENTS

| | | | |
|---|---|---|---|
| 58,644 | 2/1923 | Sweden | 198/403 |
| 1,264,622 | 2/1972 | United Kingdom | 198/377 |

Primary Examiner—Evon C. Blunk
Assistant Examiner—Richard K. Thomson
Attorney, Agent, or Firm—C. Bruce Hamburg

[57] ABSTRACT

Apparatus for simultaneously changing the orientation of articles and transporting the articles from a first location to a second location comprises a wheel, the first and second locations being adjacent the periphery of the wheel and being angularly displaced from each other relative to the periphery of the wheel, a plurality of recesses formed in the periphery of the wheel for receiving the articles, each of the recesses being of such size and shape relative to the articles as to retain each of the articles in a substantially fixed orientation relative to the recess in which the article is received, a kicker for feeding a respective one of the articles from the first location into a respective one of the recesses, a rachet for consecutively rotationally indexing the wheel thereby to bring consecutive recesses into substantial registry with the first location for receiving each of the articles fed from the first location by the kicker and a pair of rails for receiving the articles from the recesses at the second location, said rails forming means for retaining each of the articles in an orientation different from the orientation of the respective article at the first location.

1 Claim, 2 Drawing Figures

APPARATUS FOR SIMULTANEOUSLY REORIENTING AND TRANSPORTING ARTICLES

BACKGROUND OF THE INVENTION

This invention relates to apparatus for simultaneously reorienting and transporting articles. More particularly, this invention relates to an apparatus for simultaneously inverting and transporting syringe vials or syringe sub-assemblies including syringe vials.

Machines such as those described in U.S. Pat. No. 3,623,210 wash syringe sub-assemblies comprised of a syringe vial having a hypodermic needle secured to one end thereof. Such machines, which may also include stations for performing other operations such as siliconing the vial or barrel and placing a rubber sheath on the needle, transport the syringe sub-assemblies from operation to operation by means of turrets which retain the sub-assemblies vertically with the needles pointed upwardly and the flanged open ends of the vials or barrels oriented downwardly. It may thereafter be necessary to invert the sub-assemblies to facilitate handling of the sub-assemblies by another machine, such as a machine for loading the sub-assemblies into trays for storage and shipment. Accordingly, a need arose for an apparatus which would invert the sub-assemblies as they are discharged from or transported out of the aforementioned turret-type machines. In more general terms, there is a need for apparatus for simultaneously reorienting articles and transporting the articles from a first location to a second location.

It is, therefore, an object of the invention to meet the need for such reorienting and transporting apparatus.

Other objects and advantages of the invention will be apparent from the following description thereof.

SUMMARY OF THE INVENTION

According to the invention, there is provided an apparatus for simultaneously changing the orientation of articles and transporting the articles from a first location to a second location. The apparatus comprises a wheel with the first and second locations being adjacent the periphery of the wheel and being angularly displaced from each other relative to the periphery of the wheel. A plurality of recesses is formed in the periphery of the wheel for receiving the articles. Each of the recesses is of such size and shape relative to the articles as to retain each of the articles in a substantially fixed orientation relative to the recess in which the article is received. The apparatus further includes means for feeding a respective one of the articles from the first location into a respective one of the recesses, means for consecutively rotationally indexing the wheel thereby to bring consecutive recesses into substantial registry with the first location for receiving each article fed from the first location by the feeding means and means for receiving the articles from the recesses at the second location. The receiving means includes means for retaining each of the articles in an orientation different from the orientation of the respective article at the first location.

More particularly, the wheel may be in an upright plane, preferably a substantially vertical plane, and the angular displacement between the first location and the second location in the direction of rotational indexing of the wheel may be more than 90° and less than 270°, which facilitates inverting of the article in the transporting of the article from the first location to the second location. Also to this end, the means for receiving the articles may include means for retaining each of the articles in an orientation substantially inverted relative to the orientation of the article at the first location. Inversion of the articles is particularly facilitated when the first and second locations are substantially diametrically opposed relative to the wheel.

It is convenient that each recess have a configuration which permits the articles received in the recess to discharge by gravity from the recess into the receiving means at the second location.

The apparatus of the invention is especially intended for simultaneously inverting and transporting syringe sub-assemblies including syringe vials having hypodermic needles secured to one end thereof. The feeding means may comprise means for propelling each syringe sub-assembly with force sufficient to carry the sub-assembly from the first location into the recess in substantial registry with the first location but insufficient to cause damage to the sub-assembly or to cause the sub-assembly to rebound out of the recess receiving the sub-assembly. More particularly, the propelling means may comprise means for striking the sub-assemblies.

One practical form of indexing means which may be utilized in the present invention comprises a ratchet wheel secured to the recess-containing wheel and a driven ratchet pawl operatively associated with the ratchet wheel.

The vial or barrel of each of the syringe sub-assemblies will usually have an external annular flange at the end thereof opposite the needle. Assuming that the flange is downwardly oriented at the first location and the apparatus according to the invention is simultaneously to invert and transport the syringe sub-assemblies, the means for receiving the sub-assemblies and retaining the orientation thereof at the second location may comprise a pair of substantially horizontal parallel rails having a spacing therebetween greater than the largest diameter of the vials except for the flange thereof and less than the diameter of the flange whereby the flanges of the vials rest on the rails thereby to support the sub-assemblies and retain the sub-assemblies in an orientation inverted relative to the orientation of the sub-assemblies at the first location. Moreover, the rails may be inclined downwardly in a direction away from the wheel sufficiently to assist gravity transport of the sub-assemblies away from the wheel.

The apparatus according to the invention may be used in combination with apparatus for washing, and performing other operations if desired, on the sub-assemblies while the sub-assemblies are retained substantially vertically with the flanges oriented downwardly. The washing apparatus includes a turret rotatable in a substantially horizontal plane and having substantially vertical notches in the periphery thereof each for retaining a respective one of the sub-assemblies substantially vertically with the flange thereof oriented downwardly. The path of movement of each of the notches brings the sub-assemblies consecutively into juxtaposition with the aforementioned striking means at the second location for striking by the striking means and propelling thereby into a respective one of the recesses in the wheel.

DESCRIPTION OF A PREFERRED EMBODIMENT

Figure 1:
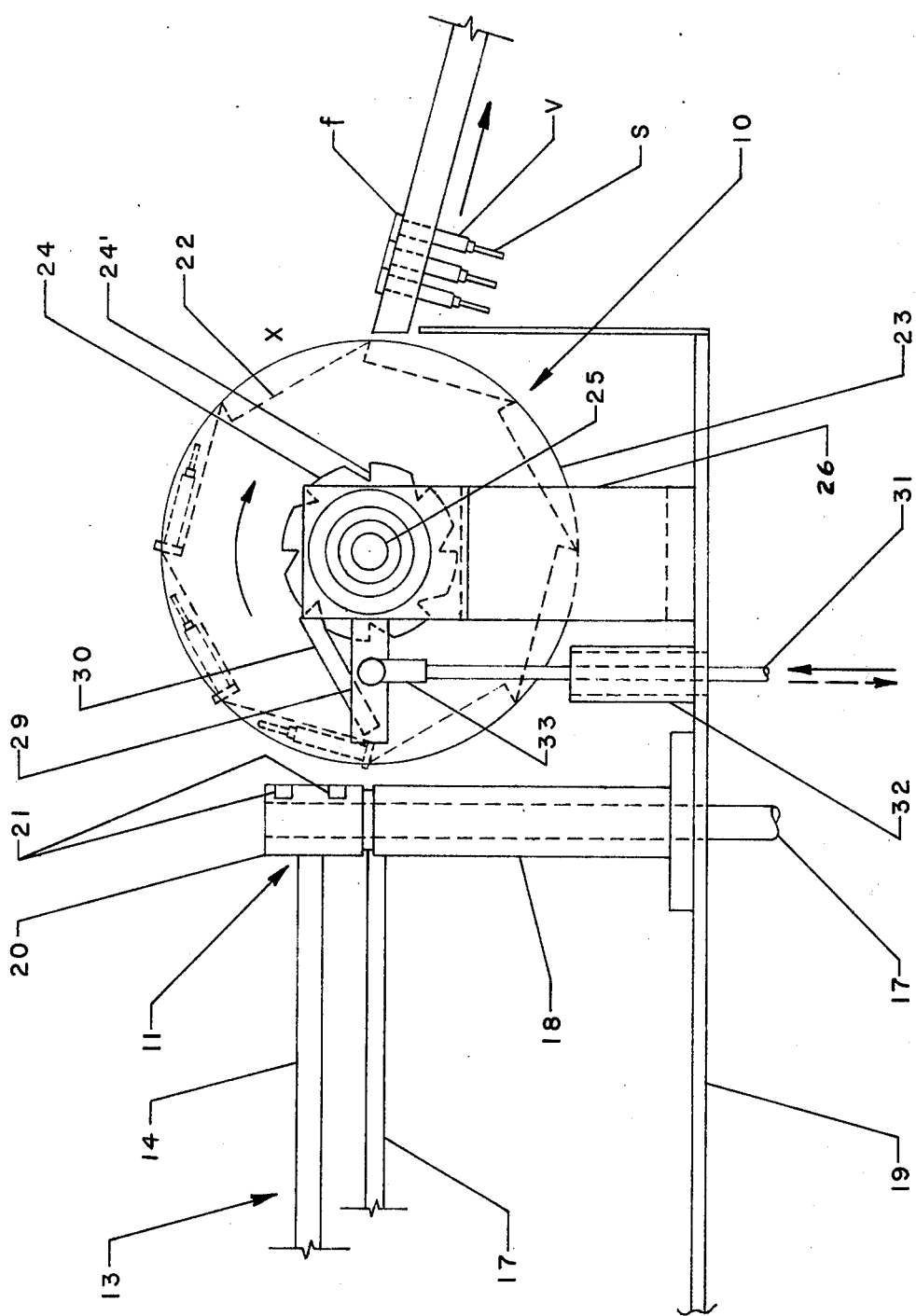
Figure 2:
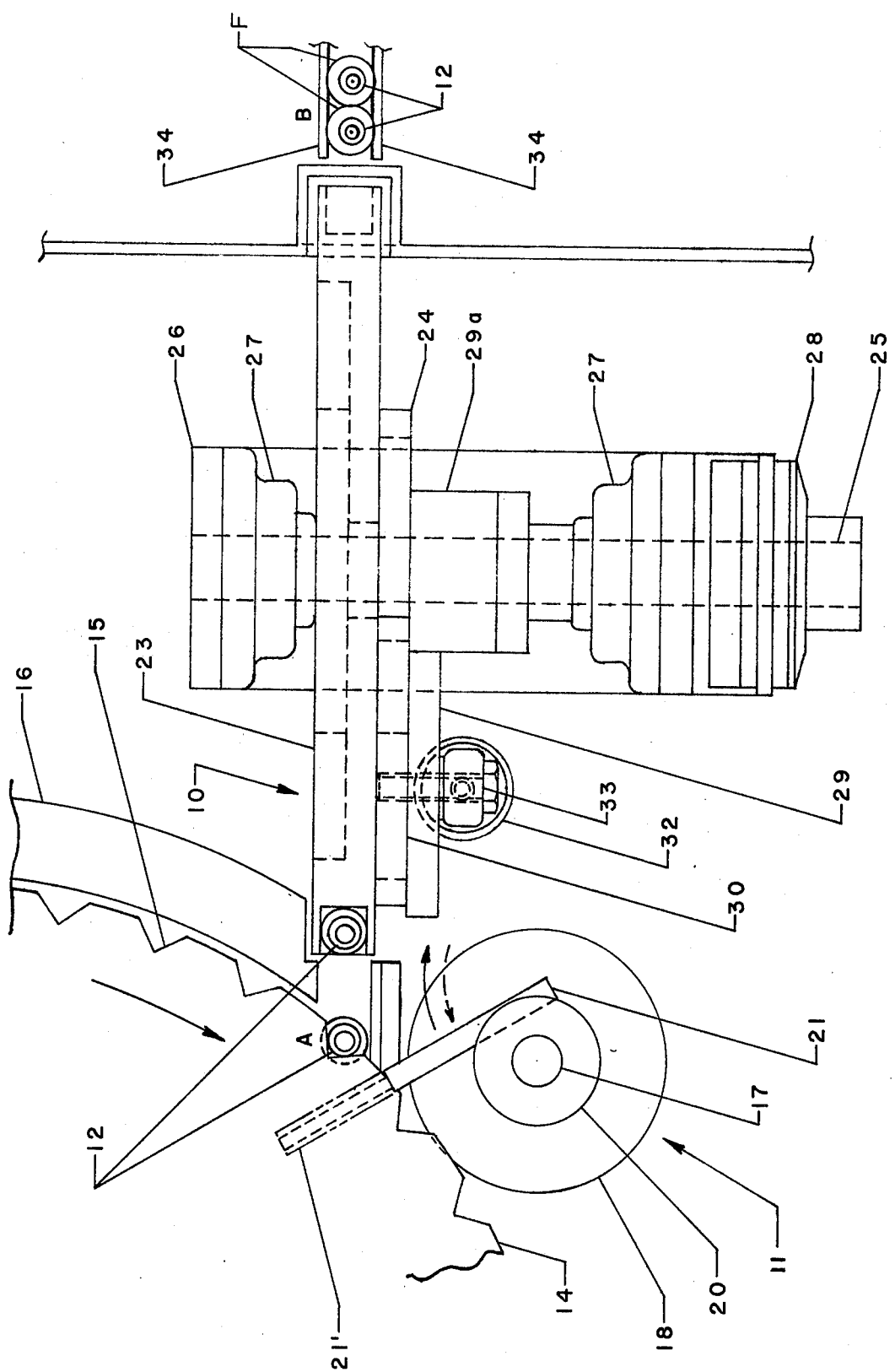

The invention will now be further described by reference to a preferred embodiment, as illustrated in the drawings, in which:

FIG. 1 is an elevation of an apparatus according to the invention in combination with a turret-type washing machine for syringe vial-needle sub-assemblies; and FIG. 2 is a plan view of the apparatus of FIG. 1.

The illustrated apparatus according to the invention comprises an inverter wheel assembly 10 and a kick-out station 11 (FIGS. 1 and 2) for inverting syringe sub-assemblies 12 while transporting them from location A to location B (FIG. 2). Each of the syringe sub-assemblies 12 comprises a glass syringe barrel or vial v having a flange f at one end thereof and affixed to the other end thereof a hypodermic needle covered by a rubber sheath s (FIG. 1).

The syringe sub-assemblies 12 are transported to location A by means of the horizontally arranged main turret 13 of a machine for washing and performing other operations on syringe sub-assemblies, such as disclosed in U.S. Pat. No. 3,623,210. The main turret 13 includes a disc 14 having recesses 15 in which the syringe sub-assemblies 12 are retained by a rail 16. A lower rail 17 supports the syringe sub-assemblies from below. The disc 14 is rotationally indexed in a direction which is clockwise as illustrated in FIG. 2. Each recess 15 until it reaches location A contains a syringe sub-assembly 12 which, in due course, is carried to location A by the rotational indexing of the disc 14. For the sake of simplicity of illustration, only the recess 15 which has reached location A in FIG. 2 is shown as containing a syringe 12.

The kick-out station 11 comprises a kicker shaft 17 received in a housing 18 mounted on the top plate 19 of the machine. Affixed to the top portion of the shaft 17 is a kicker bar holder 20 which holds a pair of identical kicker bars 21. The free end portion of each of the kicker bars 21 is of a lesser diameter than the rest of the kicker bar and has received thereon a sheath 21' of Teflon brand plastic. The kicker shaft 17 is cam-actuated by conventional mechanism (not shown). When a recess 15, which contains a syringe sub-assembly 12, reaches location A, the kicker shaft 17 is actuated so that the kicker bars 21 are rapidly moved into contact with the syringe sub-assembly 12 and then returned to the position illustrated in FIG. 2. The striking of the syringe sub-assembly 12 at location A by the kicker bars 21 propels the syringe sub-assembly 12 into a recess 22 of the inverter wheel 23. The sheathing 21' helps prevent damaging of the glass syringe vials v by the impact thereof with the kicker bars 21.

The inverter wheel station 10 includes, as mentioned hereinabove, an inverter wheel 23 having recesses 22. The inverter wheel 23 is rotationally indexed in the clockwise direction as illustrated in FIG. 1. To this end, the inverter wheel 23 together with a ratchet wheel 24 are connected to a shaft 25. The shaft 25 is rotationally mounted in bearings 27 which, in turn, is mounted to a stand 26. A torque limiter 28 is associated with the bearing 27 to counteract momentum imparted to the inverter wheel 23 by the hereinafter described ratcheting action and, thereby, to prevent the inverter wheel 23 from moving past the position to which it is rotationally indexed by the ratcheting action.

A ratchet arm 29 is pivotally mounted on the shaft 25 with the shaft 25 passing through a bore in the hub 29a of the ratchet arm 29 with sufficient clearance for the shaft 25 to rotate relative to the ratchet arm 29 and the ratchet arm 29 to pivot relative to the shaft 25. A ratchet pawl 30 is pivotally mounted on the ratchet arm 29. The ratchet pawl 30 is spring biased by conventional means (not illustrated) against the ratchet wheel 24. A tie rod 31, which is cam-actuated by a conventional mechanism (not illustrated), passes through a housing 32 mounted on the top plate 19 and is connected to the ratchet arm 29 by means of a pivotal connection 33.

When the kicker bars 21 strike the syringe sub-assembly 12 at location A, a vacant recess 22 in the inverter wheel 23 is to be aligned with location A to receive the syringe sub-assembly 12. The requisite rotation of the inverter wheel 23 is effected by a cam-actuated upward and return motion of the tie rod 31. It can readily be understood that the upward stroke of the tie rod 31 will impart a clockwise movement to the assembly of ratchet arm 29 and ratchet pawl 30, the pawl 30 thereafter riding on the outside of the ratchet wheel 24 until it is received in the next notch of the ratchet wheel 24. The inverter wheel 23 is provided with eight recesses 22 and the ratchet wheel 24 is likewise provided with eight notches 24', the positions of the recesses 22 and the notches 24' being so related that each ratcheting forward of the inverter wheel 23 by a single notch of the ratchet wheel 24 brings a successive recess 22 into alignment with location A for receiving a syringe sub-assembly 12 which had just before been carried to location A by the indexed rotation of the disc 14.

Location B is the entry end of a pair of guide rails 34 which are substantially horizontal but slightly inclined downwardly away from the inverter wheel 30 to cause syringe sub-assemblies 12 received therebetween to slide, under the influence of gravity, to a station at which they will be packed into trays for shipping and storage. It will be understood that for the sake of simplicity of illustration, all of the syringe sub-assemblies 12 along rails 34 have not been illustrated. It can be seen that at location A the syringe sub-assemblies 12 are oriented with the sheathed needles thereof pointing upwards and at location B the syringe sub-assemblies 12 have been inverted from their orientation at location A. This occurs because the syringe sub-assemblies are carried through an arc of more than 90° and less than 270° (about 180° in the particular apparatus illustrated herein) by the inverter wheel 30 in being transported thereby from location A to location B. When a recess 22 of the inverter wheel 23 has been rotationally indexed to location X (FIG. 1), gravity overcomes the friction between the syringe sub-assembly 12 and the walls of the recess 22, causing the syringe sub-assembly 12 to slide out of the recess 22 and be deposited between the rails 34 at location B. The space between the rails 34 is slightly greater than the diameter of the main portion of the vial v but less than the diameter of the flange f so that the flange f rests on the rails 34 and whereby the syringe sub-assemblies 12 are supported by the rails 34.

While the invention has been particularly described by reference to a specific embodiment thereof, it is to be understood that such description is intended to illustrate rather than limit the invention as defined by the hereto appended claims.

What is claimed is:

1. The combination of apparatus for simultaneously inverting and transporting from a first location to a second location syringe sub-assemblies including syringe vials having hypodermic needles secured to one end thereof, the vial of each of said syringe sub-assemblies having an external annular flange at the end thereof opposite the needle, said flange being downwardly oriented at said first location, and apparatus for washing said sub-assemblies while said sub-assemblies are retained substantially vertically with said flanges oriented downwardly, said washing apparatus including a turret rotatable in a substantially horizontal plane and having substantially vertical notches in the periphery thereof each for retaining a respective said sub-assembly substantially vertically with said flange thereof oriented downwardly, said inverting and transporting apparatus comprising a wheel in a substantially vertical plane, said first and second locations being adjacent the periphery of the wheel and being substantially diametrically opposed relative to said wheel, a plurality of recesses formed in the periphery of the wheel for receiving said sub-assemblies, each said recess being of such size and shape relative to said sub-assemblies as to retain each said sub-assembly in a substantially fixed orientation relative to said recess in which said sub-assembly is received as said sub-assembly is transported from said first location to said second location and to permit said sub-assembly to discharge by gravity from the recess into the receiving means at said second location, means for consecutively rotationally indexing the wheel thereby to bring consecutive said recesses into substantial registry with said first location, said indexing means comprising a ratchet wheel secured to said recess-containing wheel and a driven ratchet pawl operatively associated with the ratchet wheel, means for striking each said syringe sub-assembly with force sufficient to carry the sub-assembly from the first location into a respective said recess in substantial registry with the first location but insufficient to cause damage to said sub-assembly or to cause said sub-assembly to rebound out of said recess receiving said sub-assembly, the path of movement of each of said notches of said washing apparatus turret bringing said sub-assemblies consecutively into juxtaposition with said striking means at said second location for striking by said striking means and propelling thereby into a respective said recess of said wheel, and means for receiving said articles from said recesses at said second location, said receiving means comprising a pair of parallel rails having a spacing therebetween greater than the largest diameter of the vials except for said flange thereof and less than the diameter of said flange whereby the flanges of the vials rest on the rails thereby to support the sub-assemblies and retain the sub-assemblies in an orientation inverted relative to the orientation of the sub-assemblies at the first location, said rails being inclined downwardly in a direction away from said wheel sufficiently to assist gravity transport of said sub-assemblies away from said wheel.

* * * * *